Nov. 12, 1929.　　　F. H. OWENS　　　1,735,335
TALKING PICTURE APPARATUS
Filed June 13, 1927
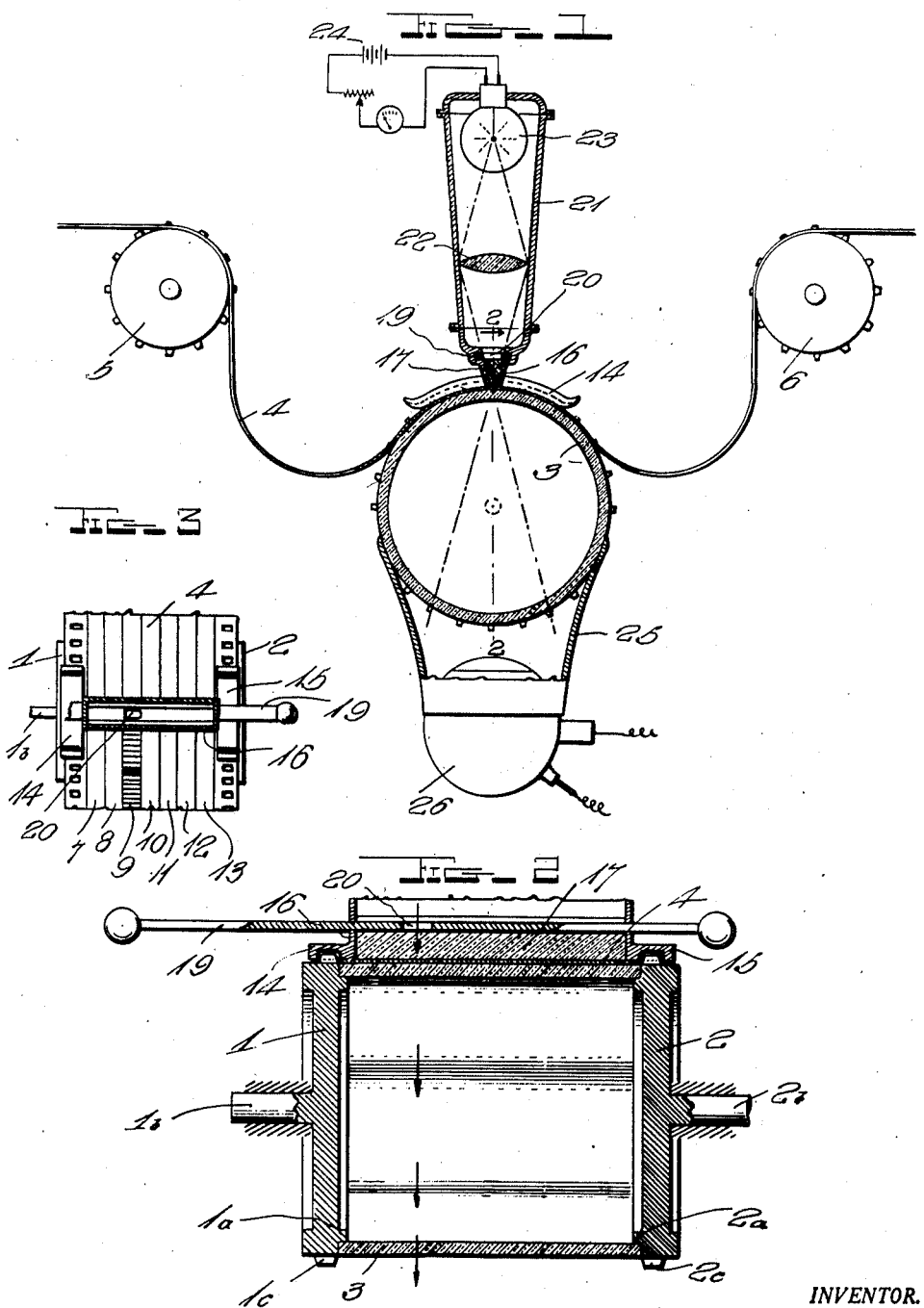
INVENTOR.
Freeman H. Owens,
BY
John B. Brady
ATTORNEY.

Patented Nov. 12, 1929

1,735,335

UNITED STATES PATENT OFFICE

FREEMAN H. OWENS, OF NEW YORK, N. Y

TALKING-PICTURE APPARATUS

Application filed June 13, 1927. Serial No. 198,647. REISSUED

My invention relates broadly to talking picture projecting systems and more particularly to film control mechanism for talking picture projecting machines.

One of the objects of my invention is to provide a talking picture projection apparatus in which a film having a sound record recorded thereon is moved over a transparent sprocket mechanism for controlling the intensity of light from a light source adjacent the film in accordance with the record on the film and the effect thereof upon a light sensitive element.

Another object of my invention is to provide a film mechanism for talking picture projection machines wherein a film having a sound record recorded thereon is passed over a transparent guiding surface and light rays directed through the film and upon a light sensitive cell on the opposite side of the transparent surface for controlling an electrical circuit and a sound reproducing system in accordance with the record on the film.

Another object of my invention is to provide means for pressing a film into continuous engagement with a transparent cylindrical surface while subjecting the film to a light slit for affecting the condition of a light sensitive cell adjacent the transparent cylindrical surface and correspondingly controlling sound reproduction in accordance with the sound record on the film.

Still another object of my invention is to provide a film mechanism for talking picture apparatus, wherein a light sensitive element is arranged on one side of a transparent cylindrical drive sprocket and a light source is arranged on the opposite side of the sprocket, and light rays directed through the sprocket upon the light sensitive element and varied in accordance with a sound record on a film which is passed over the sprocket and pressed into engagement with the surface thereof.

Other and further objects of my invention reside in the construction of an elongated light slit with a framing member thereon for directing a narrow beam of light through selected portions of the slit, as will be more fully understood from the specification hereinafter following by reference to the accompanying drawing in which:

Figure 1 diagrammatically illustrates the arrangement of the several parts of the apparatus of my invention; Fig. 2 is a cross-sectional view taken through the glass sprocket and film guide on line 2—2 of Fig. 1; and Fig. 3 is a plan view of the film guide mechanism employed in the apparatus of my invention.

Referring to the drawings in detail, I provide a pair of sprocket members 1 and 2, each including an inwardly extending shoulder $1^a$ and $2^a$, respectively. The sprocket members are carried by shafts $1^b$ and $2^b$ suitably journaled for effecting rotation of the assembled sprockets. Sprocket teeth $1^c$ and $2^c$ are provided on the peripheries of the sprockets 1 and 2 for driving the film 4 over the surface of the cylindrical member 3, which is supported between the shoulders $1^a$ and $2^a$ on sprocket members 1 and 2. The film 4 is driven by means of sprockets 5 and 6, sufficient slack being imparted to the film to enable the film to be uniformly moved over the transparent surface 3. The film 4 includes a plurality of independent rows of sound records represented in Fig. 3 at 7, 8, 9, 10, 11, 12 and 13. The film is pressed uniformly against the surface of the cylindrical member 3 by means of fingers 14 and 15 which are integrally connected with the slit holder 16. The slit holder 16 is long and narrow, extending the entire width of the film 4, and mounted in the slit holder I provide a tapered glass slit 17 which has its narrow end resting in engagement with the film 4. The slit holder 16 is slotted at opposite ends thereof to enable a slidable framing member 19 to be passed therethrough and moved to selected positions. The framing member 19 has a light aperture 20 therein, permitting light to be passed in a narrow beam through the light slit 17 from the light source 23 at any selected position across the film. The light source 23 is housed within a casing 21 and is suitably energized from a power source 24 under control of a regulating rheostat. A condensing lens system 22 is arranged in the path of the light rays from the light source 23 for directing the rays through the glass slit 17 upon the film 4 as determined by the position of the framing strip 19 and aperture 20.

In Fig. 3 I have shown the framing strip 19 located in such position that aperture 20 is immediately over the sound record which is aligned in row No. 9 enabling light to be passed through the glass slit 17 and through the sound record 9 and transparent sprocket 23 upon the light sensitive element 26 which is arranged in the housing 25. I have illustrated a photoelectric cell at 26 which may be connected in the input circuit of an amplifier system for controlling a sound reproducer in accordance with the sound record on the film 4.

Any selected record on the film may be readily reproduced by sliding the framing strip 19 to a selected position. The pad having fingers 14 and 15 serves to uniformly press the film into contact engagement with the transparent sprocket 3 for reproduction of the desired record upon the film.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. A sound reproducing system comprising means for moving a film having a sound record thereon, a cylindrical member of transparent material, means for guiding said film over said cylindrical member, a light source arranged on one side of said cylindrical member, a light sensitive cell positioned on the opposite side of said cylindrical member, a light slit disposed between said light source and said film, means adjacent said light slit for guiding said film against the surface of said cylindrical member, means for concentrating the rays from said light source through said slit and said cylindrical member upon said light sensitive cell.

2. In a system for directing light rays upon a photoelectric cell, a cylindrical member of transparent material, means for guiding a film over said cylindrical member, a source of light disposed adjacent one side of said cylindrical member, a light slit positioned between said source and said cylindrical member, means adjacent said light slit for pressing said film into engagement with the surface of said cylindrical member, means for concentrating rays of light from said source upon said slit, and a photoelectric cell disposed adjacent the opposite side of said cylindrical member for receiving light rays from said light source varied in intensity in accordance with a sound record on said film.

3. In a sound reproducing system a film having a sound record thereon, means for moving said film, a pair of sprocket members for engaging opposite sides of said film, a cylindrical member of transparent material disposed between said sprocket members, means bridging said sprocket members for pressing said film into engagement with the surface of said cylindrical member, a slit carried by said means, a light source disposed adjacent said slit, a framing member slidable laterally of said film for selectively exposing any selected portion of said film to light rays from said source, and a light sensitive cell disposed on the opposite side of said cylindrical member for receiving light rays through said slit and said cylindrical member varied in accordance with the sound record on said film.

4. In a sound reproducing system a film having a sound record thereon, means for driving said film, a transparent cylindrical member, means for guiding said film over said transparent cylindrical member, a source of light, a tapered light slit engaging said film at its tapered end disposed between said source and said film, a member mounted between said source and said slit and adjustable laterally of said film for selectively exposing any selected portion of said film to light rays, and a light sensitive cell positioned on the opposite side of said transparent cylindrical member for receiving rays of light from said source varied in accordance with the record on said film.

5. In a sound reproducing apparatus mechanism for moving a film having a sound record thereon, a cylindrical member of transparent material, a light source disposed on one side of said cylindrical member and a light sensitive cell disposed on the opposite side of said cylindrical member, means for guiding said film against the surface of said cylindrical member on the side adjacent said light source, and a light slit carried by said means and a framing member movable with respect to said slit for selectively exposing a selected portion of said film to the rays from said source, said light slit being in engagement with said film surface.

6. In a sound reproducing apparatus mechanism for moving a film having a sound record thereon, a cylindrical member of transparent material, a light source disposed on one side of said cylindrical member, and a light sensitive cell disposed on the opposite side of said cylindrical member, means for guiding said film against the surface of said cylindrical member on the side adjacent said light source, said means comprising parallel finger members arranged to engage opposite sides of said film, with a bridging member connecting said finger members for supporting a light slit therein extending the width of said film, and a framing member shiftable to selected positions over said light slit for exposing selected portions of said film to the rays from said light source for variably controlling the conductivity of said light sensitive cell.

7. In a sound reproducing apparatus a film mechanism for driving a film having a sound record thereon, a rotatable cylindrical member of transparent material, a light source disposed on one side of said cylindrical member, a light sensitive cell disposed on the opposite side of said cylindrical member, means for pressing said film into contact with the surface of said cylindrical member, said means comprising a pair of fingers engaging opposite edges of the film, a carrier for a light slit disposed between said fingers, and a framing member slidably mounted in said carrier for selectively exposing a portion of said film to the light rays from said light source for variably controlling said light sensitive cell in accordance with the record on said film.

8. In a sound reproducing system film mechanism for moving a film having a sound record thereon, a pair of rotatable sprocket members, a transparent cylindrical member mounted between said sprocket members and rotatable therewith, a pair of parallel finger members arranged to engage opposite edges of said film for pressing the film into engagement with said transparent cylindrical member, a tapered carrier disposed between said finger members, a glass slit positioned in said tapered carrier and having the edges thereof engaging the surface of said film, a light source disposed adjacent said slit for directing light rays thereon, a light sensitive cell positioned on the opposite side of said cylindrical member, and a framing member having a light aperture therein for subjecting said light sensitive cell to light rays from said source under control of the sound record on said film.

In testimony whereof I affix my signature.

FREEMAN H. OWENS.